(No Model.)

A. P. SEYMOUR.
INSULATING TUBE FOR ELECTRIC CONDUCTORS.

No. 476,964. Patented June 14, 1892.

ATTEST:

INVENTOR:
Albert P. Seymour

By E. H. L. Townsend
Attorney

UNITED STATES PATENT OFFICE.

ALBERT P. SEYMOUR, OF SYRACUSE, NEW YORK.

INSULATING-TUBE FOR ELECTRIC CONDUCTORS.

SPECIFICATION forming part of Letters Patent No. 476,964, dated June 14, 1892.

Application filed March 5, 1892. Serial No. 423,831. (No model.)

*To all whom it may concern:*

Be it known that I, ALBERT P. SEYMOUR, a citizen of the United States, and a resident of Syracuse, in the county of Onondaga and State of New York, have invented a certain new and useful Wiring-Tube, of which the following is a specification.

My invention relates to wiring-tubes used in running electric wires in buildings or other situations where it is desired to carry the wire through a joist or joists or through other woodwork or material, but is especially designed to furnish a tube suited for use in concealed work, wherein the wire is to be run through a line of joists.

The object of my invention is to furnish a cheap, efficient, and reliable wiring-tube that may be used as a substitute for the rubber wiring-tubes at present employed.

The invention consists, further, in a wiring-tube adapted to be driven through a hole provided for its reception and furnished with one or more lateral enlargements or projections at its entering end, adapted to hold the tube in position when the tube is driven home, so that its end will project through the hole.

My invention consists, further, in the combination, with the joist or other piece of wood B, of a wiring-tube of insulating material driven or forced through a hole in the piece B and held in place therein by lateral projections on opposite ends of the tube.

The invention consists, further, in the novel features specified in the claims.

Figure 1:
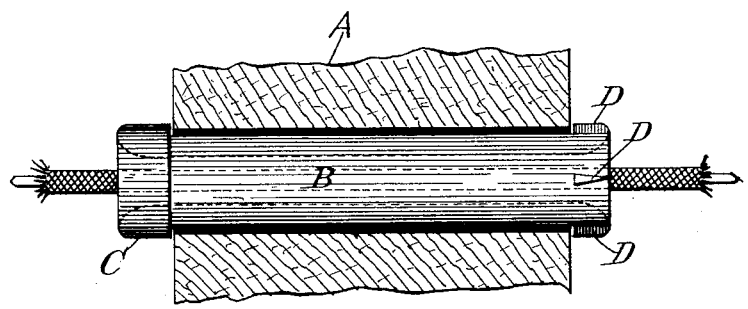
Figure 2:
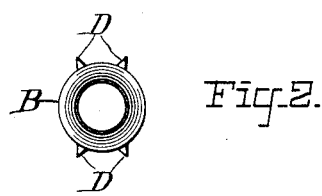
Figure 3:
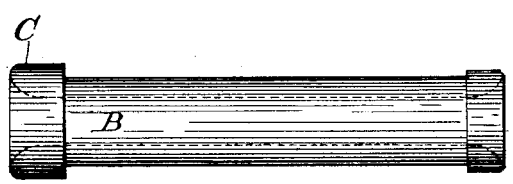

In the accompanying drawings, Figure 1 is a cross-section through a piece of joist or other material, showing a wiring-tube formed in accordance with my invention as driven home in position in the body of wood or other substance in which a hole has been bored or formed for its reception. Fig. 2 is an end view of the wiring-tube. Fig. 3 is a side view of a modification in the form of the tube.

A indicates the joist or other piece of wood; B, the body of the tube; C, the head, and D a number of slight projections projecting laterally from the entering end of the tube or that which first enters the hole or perforation and disposed, preferably, at irregular intervals. The body of the tube is made an easy fit for the hole provided for its reception. The projections D do not prevent the tube from being driven; but when they have passed through the hole will prevent it from being withdrawn if the tube be slightly rotated, so as to carry the projections to one side of the grooves which they may have formed in the body of the wood A by driving the tube. They will even prevent it from being withdrawn, except by the exertion of considerable force, when they are in line with the grooves or depressions formed by driving of the tube.

Any number of projections D D may be used, and, as illustrated in Fig. 3, it would be within my invention to employ a single continuous projection, forming an annular enlargement at the entering end of the tube. This projection will, like the projections D, serve to prevent the tube from being withdrawn after it has been driven through the hole, so as to bring such enlargement outside the bore provided for the reception of the tube. Tubes thus formed and driven cannot be displaced when the wire is drawn through and no tapping is required to hold them in position, as is the case when the ordinary rubber tubing is used. When made of strong china or porcelain—such as is known in the trade as "Syracuse china"—there is no danger of breaking them by driving, and they are much safer than rubber, as they afford a perfect insulation, non-destructible by fire or heat. Owing to the facility with which they may be applied, and to the fact that it becomes unnecessary to employ any special means for holding them in place after once inserted in the wood, wiring may be done by the use of these tubes at much less cost.

Instead of china or porcelain such as described, other vitreous substances might be employed, provided they be sufficiently tough to stand the blow of a mallet used in driving the tube home in the socket or hole bored or formed for its reception.

The tube is shown as applied in position in one of a line of joists through which the wire is carried, as is frequently done in wiring buildings where it is desired that the wires should be concealed and no other place is provided for them.

What I claim as my invention is—

1. The combination, with the joist or other piece of wood B, of a wiring-tube of insulating material fitting a hole in the piece B and held in place therein by lateral projections on opposite ends of the tube.

2. As a new article of manufacture, a wiring-tube made of porcelain or similar vitreous material, formed, as described, with a body made as an easy fit for the hole into which it is to be driven and with its ends enlarged, whereby said tube may be driven and when driven will be held against withdrawal by said projections.

3. As a new article of manufacture, a wiring-tube of insulating material adapted to be driven through a hole provided for its reception and provided with a slight lateral enlargement or projection, one or more, at its entrance end, as and for the purpose described.

4. As a new article of manufacture, a china or porcelain tube adapted to be driven through a hole provided for its reception and furnished at its entering end with one or more separate slight projections placed at irregular intervals, as and for the purpose described.

5. As a new article of manufacture, a wiring-tube having a head C and a body B, forming an easy fit for the hole into which the tube is to be driven, and furnished at its entrance end with one or more lateral enlargements or projections adapted to permit the tube to be driven, but to hold it in place when its end is forced through the hole.

Signed at Syracuse, in the county of Onondaga and State of New York, this 2d day of March, A. D. 1892.

ALBERT P. SEYMOUR.

Witnesses:
JOHN C. KEEFFE,
EDWARD O. WARD.